Oct. 14, 1924.  
A. E. ASHCRAFT  
SCALE  
Filed March 16, 1921  
1,511,490  
6 Sheets-Sheet 1

INVENTOR  
Alan E. Ashcraft  
BY  
Duell, Warfield & Duell  
ATTORNEY

Oct. 14, 1924.  
A. E. ASHCRAFT  
1,511,490  
SCALE  
Filed March 16, 1921  
6 Sheets-Sheet 2
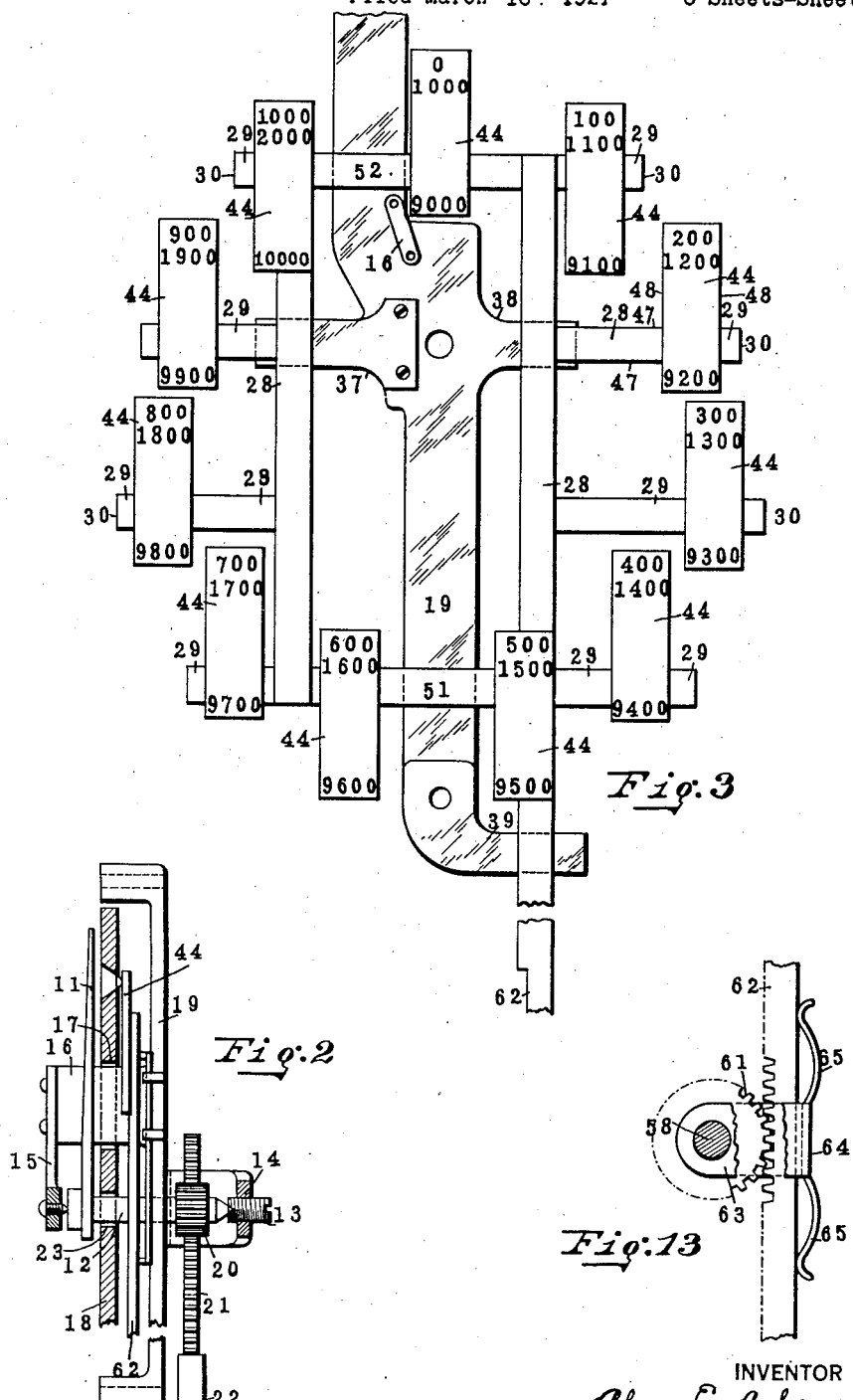
INVENTOR  
Alan E. Ashcraft  
BY  
Duell, Warfield & Duell  
ATTORNEY Oct. 14, 1924.

A. E. ASHCRAFT

SCALE

Filed March 16, 1921

INVENTOR
Alan E. Ashcraft
BY
*[signature]*
ATTORNEY

Oct. 14, 1924.  
A. E. ASHCRAFT  
1,511,490  
SCALE  
Filed March 16, 1921  
6 Sheets-Sheet 4

INVENTOR  
Alan E. Ashcraft  
BY  
Duell, Warfield & Duell  
ATTORNEY

Oct. 14, 1924.　　　　　　　　　　　　　　1,511,490
A. E. ASHCRAFT
SCALE
Filed March 16, 1921　　　6 Sheets-Sheet 5
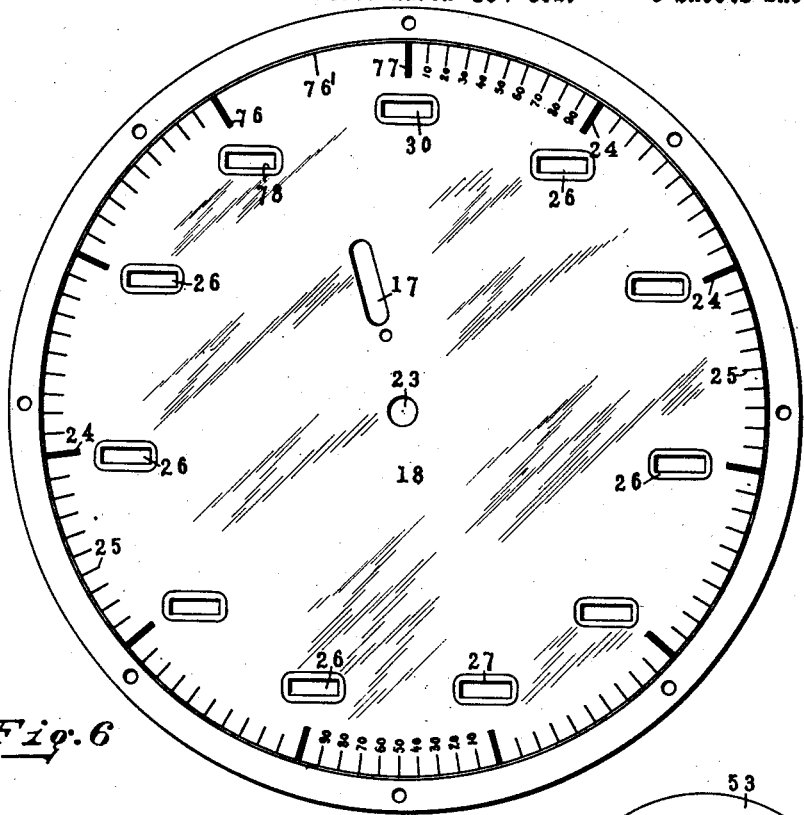
Fig. 6
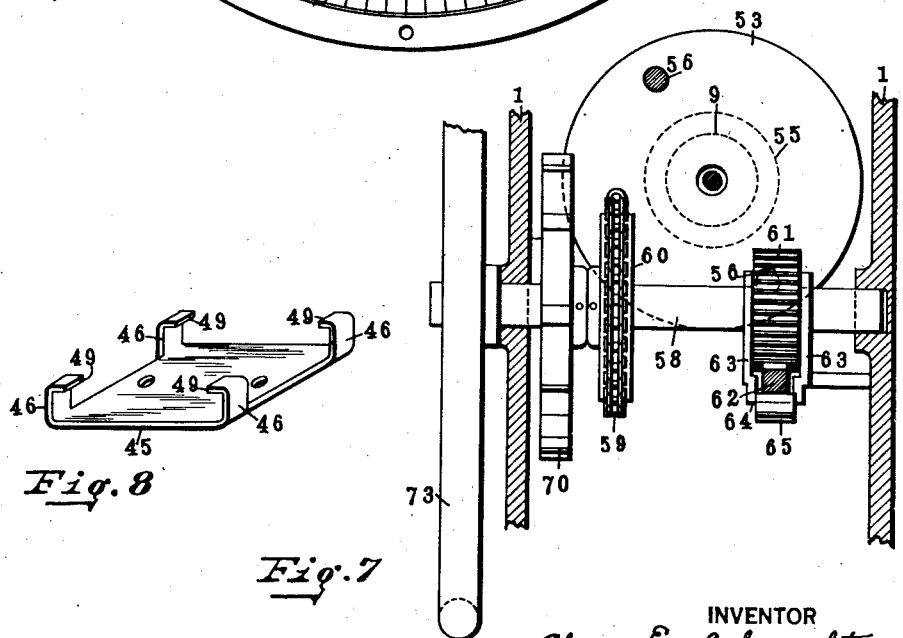
Fig. 8
Fig. 7
INVENTOR
Alan E. Ashcraft
BY
Duell, Warfield & Duell
ATTORNEY Oct. 14, 1924.

A. E. ASHCRAFT 1,511,490

SCALE

Filed March 16, 1921    6 Sheets-Sheet 6

INVENTOR
Alan E. Ashcraft
BY
Duell, Warfield & Duell
ATTORNEY

Patented Oct. 14, 1924.

1,511,490

UNITED STATES PATENT OFFICE.

ALAN E. ASHCRAFT, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE.

Application filed March 16, 1921. Serial No. 452,710.

*To all whom it may concern:*

Be it known that I, ALAN E. ASHCRAFT, a citizen of the United States, residing at St. Johnsbury, in the county of Caledonia and State of Vermont, have invented certain new and useful Improvements in Scales, of which the following is a full, clear, and exact description, such as will enable others skilled in the art to which it appertains to make and use the same.

This invention relates to weighing scales and with respect to its more specific features to scales in which the weight of the load is automatically indicated on a dial.

One of the objects of the invention is the provision of an indicating device adapted to show a wide range of direct reading with a dial of relatively small area.

Another object of the invention is the provision of a practical device for increasing the accuracy of the weight indications of dial scales with minimum cost of manufacture.

Another object of the invention is the simplification of the building and assembling of dial scales with total capacity indicators so as to render the indicators applicable to various arrangements and different sizes of dials.

Another object of the invention is provision for the ready assembly and replacement of the indicating parts of total capacity dial scales.

Another object of the invention is the provision of a simple construction of number carrier capable of a wide field of adjustment without requiring material variation in structural details.

Another object of the invention is the provision of a device permitting movement of a number carrier alongside the dial and close thereto without defacement of or obstruction by the numbers or other indicia on the carrier.

Another object of the invention is the provision of a simple and practical total capacity number carrier so co-operating with the permanent graduations of the stationary dial as to exhibit the total capacity practically as a direct reading at a multiplicity of convenient points along a substantially complete and graduated circle.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views, Figure 1 is a vertical longitudinal section through the casing of a scale mechanism embodying the invention showing the scale and associated parts in assembled relation;

Fig. 2 is a vertical transverse section through the dial pointer shaft of the stationary dial and adjacent parts;

Fig. 3 is a detail front view of a number carrier and a supporting frame member, the number plates being diagrammatically illustrated in position, some of the numbers being omitted;

Fig. 6 is a front view of the stationary dial;

Fig. 7 is a horizontal section through the shaft which supports the poise-weight holder, showing associated parts;

Fig. 8 is a detail perspective view of one of the clamp plates employed in securing the number plates to the carrier;

Fig. 9 is a detail front view of a portion of the stationary dial showing one of the windows and a number plate back of the same;

Fig. 10 is a section of Fig. 9 on the line *a, a.*

Figs. 11 and 12 are detail views showing the assembly relation of a number plate with a branch of the carrier;

Fig. 13 is a vertical section through the shaft which supports the poise-weight holder showing the rack bar as associated with the pinion connected to said shaft;

Figure 1:
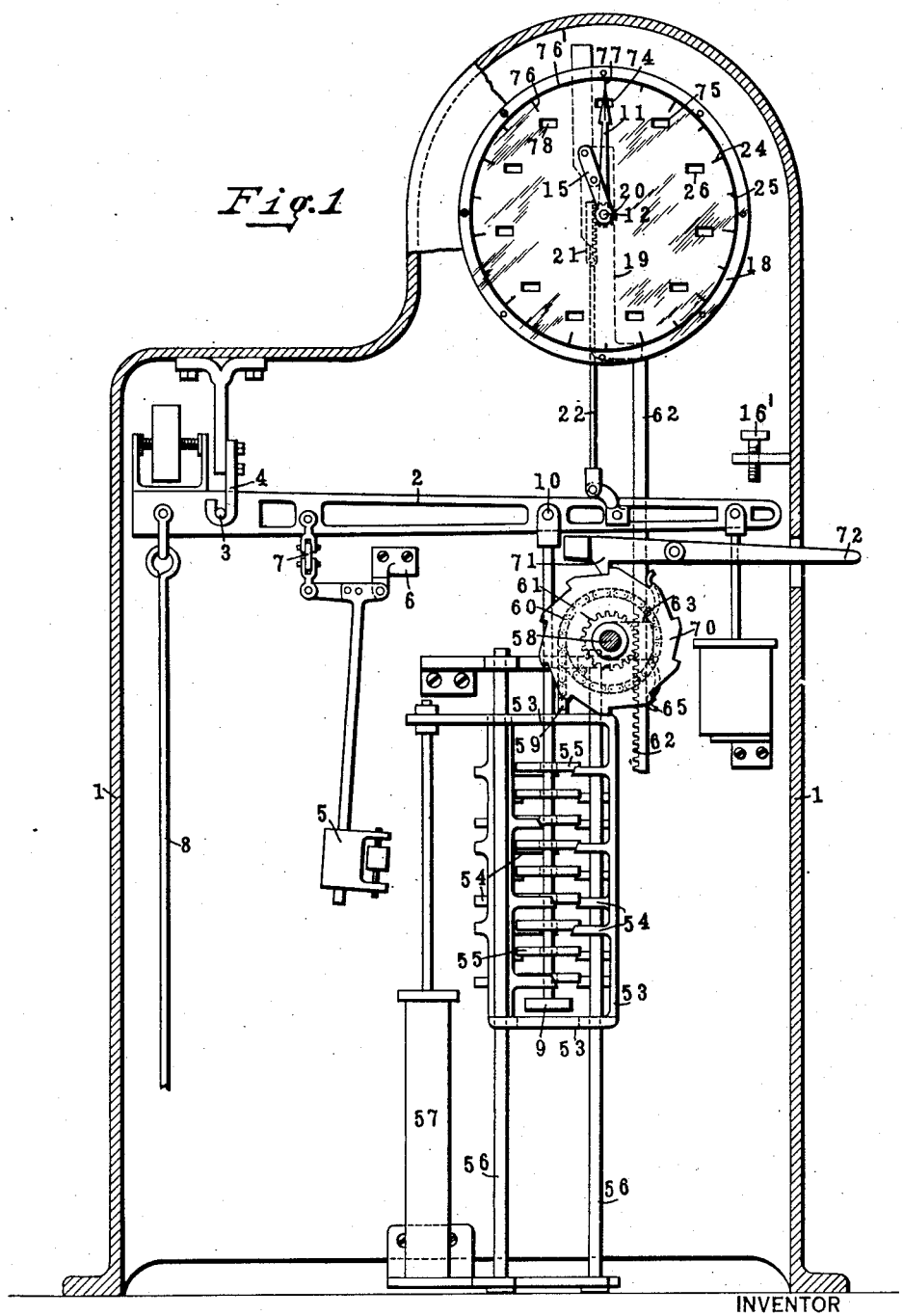
Figure 4:
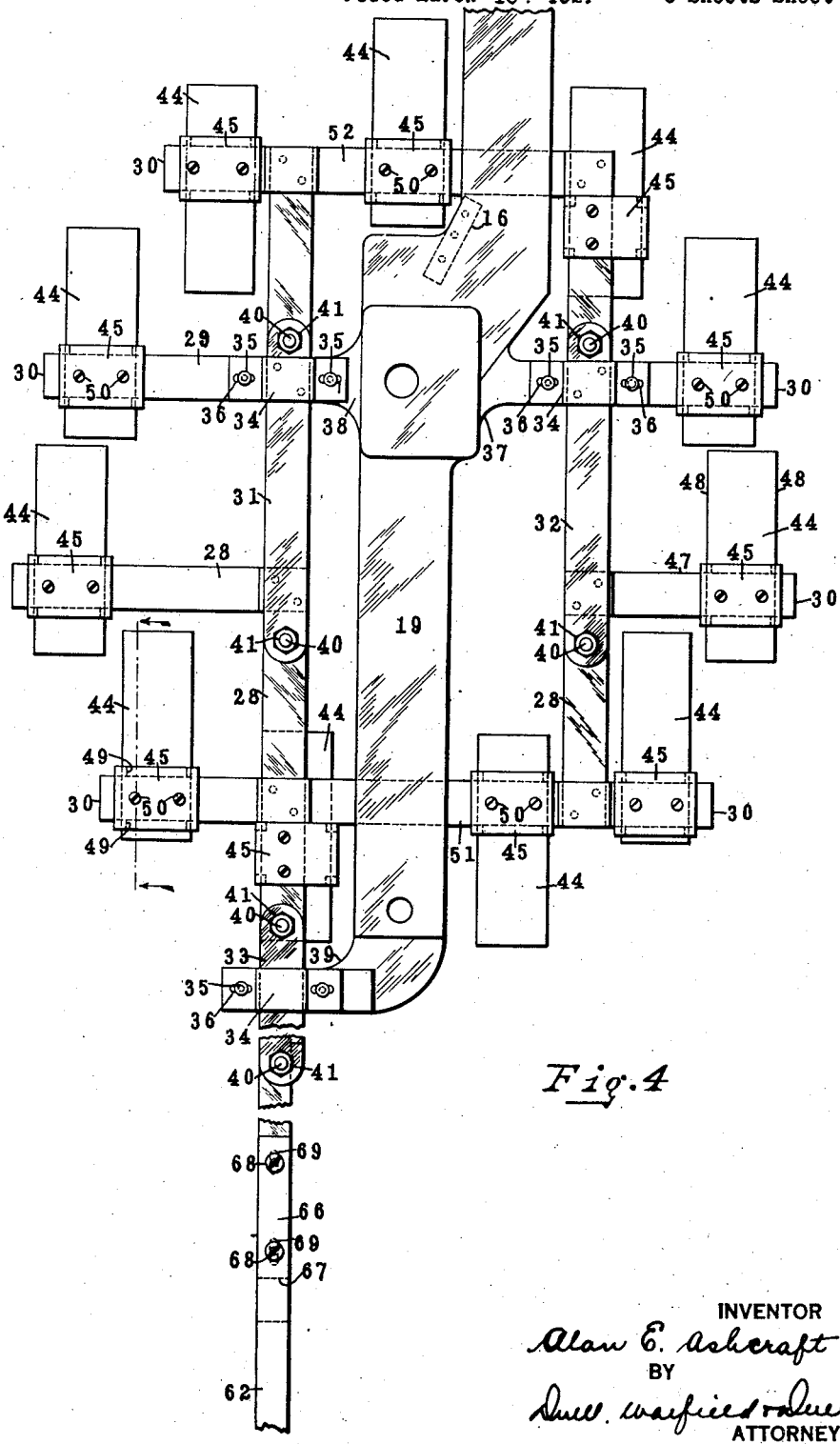
Fig. 4 is a detail rear view of the number carrier and the supporting frame member, slightly enlarged over Fig. 3.

Referring now more specifically to the drawings and particularly to Fig. 1 thereof, a scale casing is indicated by the numeral 1. The numeral 2 indicates a weighing beam fulcrumed, or pivoted to the casing, or frame 1 by means of a bracket 4 and pivot 3. At 5 is indicated a pendulum, in the present instance pivoted to a bracket 6 fastened to the casing and having link connection 7 with the beam 2, the province of the pendulum being to counter-balance a load up to the capacity of the dial. At 8 is indicated a load supporting rod which extends downwardly from the beam 2 and is connected to the platform levers of the scale in any ordinary manner. The numeral 9 indicates a poiseweight receiver, or pan, pivoted to the weighing beam 2 at 10. The numeral 11 indicates the dial pointer, being in the present instance a hand carried by a short shaft 12 (Fig. 2) the axis of which is within the graduated circumference of the dial and journaled at its inner end on the end of a screw 13 adjustably mounted in a bracket 14 attached to the casing 1, the outer end of the shaft 12 being journaled on a screw in a depending member firmly fastened to the end of a lug 16 forwardly projecting through an elongated opening 17 in the stationary dial 18. The lug 16 is supported by or forms part of a relatively heavy and substantial frame, or frame member 19, (see Fig. 4) which is bolted to the rear of the casing and thereby firmly held in place.

The dial pointer 11 is operably connected to the beam 2 and travels over the graduations of the dial in either of opposite directions in response to movements of said beam. Upward travel of this beam 2 may be limited by a stop 16'. For operating this pointer the shaft 12 is provided with a pinion 20, and a rack 21 and a rod 22 communicate movement to the pointer from said beam. As the beam rises and falls the pointer 11 travels in one direction or the other and indicates on the dial a weight within the capacity of the dial.

The dial 18 in the present embodiment is stationary and made of sheet metal. At its center is an opening 23 through which the dial shaft 12 freely extends. At or adjacent its periphery the front face of the dial is graduated up to the capacity of the dial, and for a full circumference, or circular line, lacking only a small arc, hereinafter referred to, the graduations including a plurality of main graduations 24 and a plurality of supplemental graduations 25, the supplemental graduations in the present embodiment indicating ten pound intervals on the dial and the main graduations indicating one hundred pound intervals. As illustrated, the supplemental graduations of each series thereof are similarly permanently numbered 10, 20, 30, 40, 50, 60, 70, 80, 90, whereas the main graduations 24 are not permanently numbered, although they may be if desired. It will now be seen that the dial has a plurality of series of graduations, in circular alignment, each series permanently numbered in increasing value. Inasmuch as the capacity of the dial is measured by the sum total of all the graduations it will be perceived that each series of graduations referred to individually comprehends less than the capacity of the dial. Adjacent each series of graduations referred to and, as illustrated, at the beginning of each series adjacent each main graduation 24, is a window, or aperture 26, in the dial, for the display, or exhibition, of numbers on a carrier hereinafter referred to, which numbers are to be read in conjunction with the supplemental graduations, when the supplemental graduations are needed to indicate the full load on the scale. In the present embodiment the indicating face of the carrier is spaced a short distance in rear of the front face of the dial 18. In this space adjacent each window is disposed a screen member for obscuring all numbers except the one in indicating position at the window. The screen member is indicated at 27, being one of the walls or sides of the window, this window being formed by stamping rearwardly the material of the dial 18 so as to form a generally rectangular tube tapering in a direction from the front face of the dial toward the rear and projecting from the rear face of the dial, the walls of the tube or screen member preferably inclining from the dial toward the central line of a number brought by the carrier to exhibition position at the window. At the edge of the projection formed by the screen member or rectangular tube are distance pieces, as the nibs 28' extending slightly beyond said edge toward the adjacent number plate hereinafter referred to, these nibs being on opposite sides of the window and outside the lateral margin of the numbers on the adjacent number plate so as to serve as carrier bearings as hereinafter explained. The rectangular tubular member formed by the walls 27 terminates short of the carrier plate opposite the path of the numbers on said plate, except for the provision of the nibs 28'. It will be perceived that the nibs 28' space the numbers on the carrier rearwardly of the window edges formed by the walls 27 directly opposite the numbers so that neither the numbers, nor the visible field of the number plates will contact with the dial parts while operating, thus avoiding marring and scratching of these numbers as well as obstruction should the numbers be raised on the face of the number plates.

At the rear of the dial 18 is a carrier between which and the dial there is relative movement to bring the numbers on the carrier into and out of operative, or exhibition position relative to the dial. In Fig. 3 the carrier is indicated from the front, a rear view being illustrated in Fig. 4. In the illustrated embodiment the carrier reciprocally moves relative to the dial 18 and parallel to the plane of the dial, being also adjustable toward and from the dial. The carrier is of skeleton structure being composed of metallic branches or members 28, these branches being bars having flat front faces, some of the bars as indicated at 29 having free ends 30. The carrier may be cast in one piece or as illustrated may be composed of flat metallic strips fastened together into a unitary carrier frame in which the branches 29 will be in the nature of projecting arms.

Figure 5:
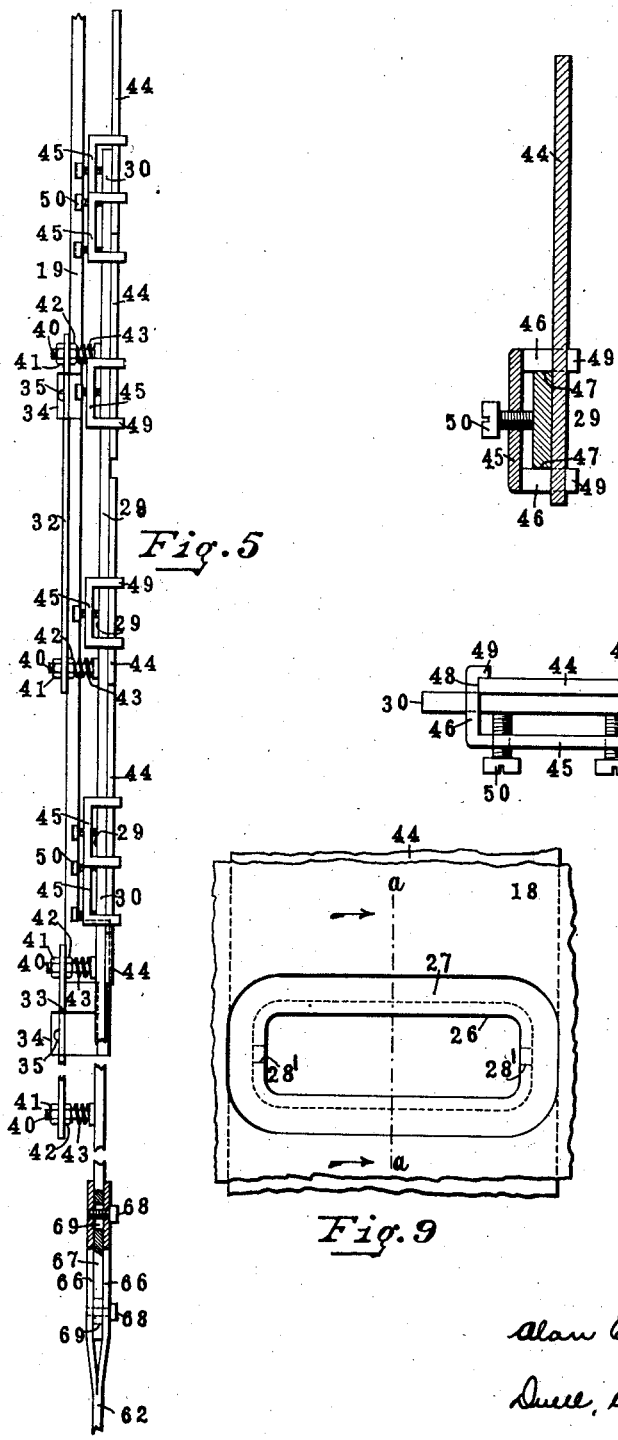
Fig. 5 is a side view of the number carrier and the supporting frame member.

The skeleton carrier is guided on the frame or frame bracket 19 by one or more flat guide bars, three of such guide bars being employed in the present embodiment and illustrated at 31, 32 and 33. The guide bars are reciprocal on the frame member 19 and held thereto by the binders or keepers 34 which lie across the guide bars and are held to the frame 19 by screws 35 passing through slots 36 in the binders and screwing into suitable parts of the frame member 19, as the arms 37, 38 and 39, the carrier being disposed in front of the frame member 19 and close to the rear face of the dial 18. The screw and slot connection between the binders 34 and the carrier frame 19 provide for the adjustment of the carrier relative to the frame 19 laterally of the path of movement of the carrier. The carrier frame is also adjustable toward and from the guide bars 31, 32 and 33 so as to determine its plane of movement, this adjustment consisting of two studs 40 for each guide bar (see Figs. 4 and 5), these studs being anchored to the branches of the carrier frame and having screw-threaded outer ends which freely pass through the guide bars, nuts 41 and 42 being employed to hold the carrier frame in its relation as spaced from the guide bars, the studs 40 being surrounded by springs 43 which press against the nuts 42 and restrain them from turning.

In the present embodiment the numbers on the carrier are formed on the front enameled faces of number plates 44, being slightly sunk therein, said plates each being independently adjustable longitudinally and laterally on the branches to which they are attached and thereby having similar adjustment relative to their reciprocal path. For the purpose of attaching and retaining the number plates on the carrier, devices may be employed which are similar for each number plate so that a description of one will suffice for all. The numeral 45 indicates a removable holding, or clamping, plate lying directly opposite a rear face of a branch or bar of the carrier frame and having four legs 46 extending across the opposite edges or sides 47 of such branch or bar, the legs 46 also extending across opposite edges 48 of the number plate 44 to be retained in place. The number plate 44 has a rear flat face which is placed against the front flat face of the branch or arm and the legs 46 are provided with clamping jaws, or feet 49, which overlap the front face of the number plate. Threaded through the clamping plate 45 are one or more screws 50, two being illustrated, which engage the rear face of the branch 29 of the carrier, so that upon turning the screws the jaws 49 are drawn against the number plate and against the branch 29 to effect the attachment. The plates 45 with the legs and feet referred to are slidable on the branches of the carrier and may be removed from the arms 29 over the free ends of the latter so that by the construction described the number plates may be held in any position of adjustment on the carrier branches. Furthermore, the feet or clamping jaws at one edge of the clamping plate 45 are spaced from the feet or jaws at the opposite edge at such a distance as to permit the plate 45 with the clamping jaws 49 carried thereby to be applied directly to a branch of the carrier which has no free end, as for instance, the branches 51 and 52 (see Fig. 4). Thus the number plates are not only adjustable on the carrier, as stated, but may be removed and replaced as desired. Furthermore, inasmuch as all of the carrier plates will usually be rectangular and of the same size the attaching means therefor is universally applicable so that they may be made in quantities.

In the present embodiment the means to operate the number carrier in order to exhibit the numbers thereon in conjunction with the dial 18 is as follows:—A poise-weight holder is employed and may be a weight cage indicated by the numeral 53 including sets of inwardly projecting arms 54 spaced apart longitudinally of the cage, each set supporting a weight equal in weight value to the capacity of the dial 18. The cage 53 is so disposed that the several weights 55 supported thereby will be successively transferred to the pendant weight receiver 9 as the weight cage gravitates downwardly, as is understood in this art, the several sets of cage arms 54 being so spaced apart as to permit the full oscillation of the weighing beam 2 without the weights on the receiver 9 coming into contact with the weights remaining on the cage. The weight cage may be guided in its up and down movements by guide rods 56 held by brackets on the frame, and a dash-pot 57 may be employed to prevent the sudden descent of the weight cage. The numeral 58 indicates a rotatable shaft supported by and extending transversely of the frame of the machine, from which shaft the weight cage is suspended by means of a chain 59, one end of the chain being directly connected to a pulley 60 rotatable with the shaft 58. On the shaft 58 and rotatable therewith is a pinion 61 with which engages the lower end of a rack or rack bar 62, the upper end of this rack bar being operatively connected so that the reciprocation of the rack bar imparts reciprocal movement to the carrier hereinbefore referred to. In the present embodiment the arrangement of the rack bar 62 relative to the weight cage is such that the weight of the rack bar and the carrier parts is opposed to the weight of the weight cage and its parts by means of the connection to shaft 58 through pinion 61 so that descent of the weight cage tends to raise the rack 62 and the carrier. In order to guide the rack bar 62 and maintain it in engagement with the pinion 61 there is provided a metal yoke the arms 63 of which (see Figs. 7 and 13) are loosely supported by the shaft 58 and preferably these arms are disposed quite close to the respective opposite sides of the pinion 61 so as to hold the yoke in position longitudinally of shaft 58. As illustrated, the shaft 58 passes through the openings in the arms 63 of the yoke. The cross piece 64 of the yoke is disposed at the side of the rack bar 62 and the yoke has arms 65 integral therewith, which arms may be bent to keep the rack in co-operative relation to the pinion 61.

In the present embodiment the rack bar 62 is directly connected to the frame of the number carrier and depends therefrom. The upper end of the rack bar 62 has a fork comprising two tines 66 (Fig. 5) between which lies an extension of one of the branches or bars of the carrier frame as illustrated at 67. The extension has an elongated bearing between the tines 66 and is clamped between the tines by screws 68 engaging the opposite tines and passing through slots 69 in the intermediate extension, thus providing for adjustment of the carrier frame longitudinally of its path of movement.

It is within the purview of the present invention to set the poise-weight holder in operation automatically so that when a load is weighed which exceeds the capacity of the dial the poise-weight holder is automatically influenced to apply the capacity weights 55 to the poise-weight receiver 9. In the illustrated embodiment, however the descent of the poise-weight holder and its arrest at various points in its path of travel is manually controlled through the instrumentality of a detent mechanism consisting of a ratchet wheel 70 fixed to rotate with the shaft 58 and co-operating with a manually operable pawl 71, having a handle 72 projecting through an opening in the casing 1, the opposite end of the pawl being weighted to cause it to gravitate into co-operative relation with the teeth of the ratchet wheel. Also, on the shaft 58 outside the casing 1 is a manually operable device as a hand wheel 73 (Fig. 7) adapted to rotate the shaft 58 in a direction to raise the poise-weight receiver, or weight cage, which latter as it rises recovers from the weight receiver 9 the capacity weights 55 which may have been transferred thereto upon descent of the weight cage. Also by operation of the hand wheel 73, the number carrier is moved downwardly to bring the initial numbers of each series on the number plate simultaneously opposite the several windows in the dial, thus numbering the graduated line for weights within the capacity of the dial.

Figures 14, 15, 16, 17:
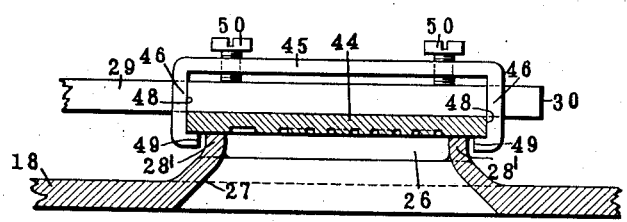
Fig. 14 is a front view of the number plate for the first window at the beginning of the graduations on the dial.
Fig. 15 is a front view of the number plate for the second window.
Fig. 16 is a front view of the number plate for the last window.
Fig. 17 is a transverse section through the dial and associated number plate at one window.

In Figs. 14 and 15 of the drawings are illustrated two of the number plates 44 each with a series of load numbers thereon, two adjacent number plates being selected in order to disclose the relation between the load numbers of one to those of the other as well as the relation between the numbers of each series. It will be understood that in the best form of the scale herein referred to the number of number plates will be the same as the number of windows 26 in the dial. In Fig. 14 the series of numbers on the number plate co-operating with the first window 74 is illustrated and in Fig. 15, the series of numbers on the number plate co-acting with the second window 75 is illustrated. Taking either plate it will be perceived that the numbers thereon are in orderly arrangement from the beginning to the end of the series reading either up or down, and that successive numbers in each plate differ from each other by the capacity of the dial, which capacity in the present embodiment is one thousand (1000) pounds, in accordance with the ten (10) series or sets of graduations in circular alignment on the dial each series comprehending one hundred (100) pounds. It will further be observed that the relation between any number of the series on one plate and the number of the same order in the series on the other plate is such that the selected number on one plate differs from the number of the same order in the other plate by one hundred (100), which is the total comprehended by the individual dial series between the two number plates when operating in conjunction with a dial in which each individual series comprehends one hundred (100) pounds. It will further be noted that in the present embodiment the windows, generally indicated by the numeral 26 and including the first window 74 are disposed in a position generally radially opposite the main dial graduations 24, so that these main dial graduations are numbered by the exhibition of the numbers registering at the several windows referred to, such windows being at the beginning of each individual dial series.

Directly between the last main graduation on the dial, indicated specially by the numeral 76, and the first graduation indicated specially by the numeral 77, a small arc 76' of the dial is preferably not graduated, but a window 78 similar to the windows hereinbefore described is located adjacent the last main graduation 76, and the carrier is provided with an additional plate 44 approximately numbered to indicate the weight corresponding to the pointer 11 when registering with the graduation 76. This additional plate is illustrated in Fig. 16. The graduation 76, being the last graduation, will exhibit the numbers 1000, 2000 et seq. as will be understood, the numbers on this plate differing from each other by the capacity of the dial and numbers of the same order on this plate differing from numbers of the same order on the antecedent plates by one hundred (100) pounds.

Although but three of the number plates have been specifically described it will be understood that the numbers on each plate and the relation between the numbers on one plate and the numbers on the next succeeding plates bear the relation to each other explained in connection with Figs. 14 and 15.

When a load is placed on the platform, or load receiver, of the scale the right arm of the weighbeam 2, rises and turns the pointer to the right (Fig. 1). Should the load be within the capacity of the dial, in the present embodiment one thousand (1000) pounds or less, the pointer 11 will turn relative to the dial and to the proper graduation to indicate the weight of the load and at this time the initial numbers of each series on the number carrier will be in position simultaneously at the windows to exhibit the number zero (0) at the first window 74, one hundred (100) at the second window 75, two hundred (200) at the third window and so on, the number one thousand (1000) being exhibited at the last window 78. Should the load be thirty-five hundred (3500) pounds the pointer 11 may turn on the dial until it has passed the last main graduation 76, which will indicate to the operator, if he has not already apprehended the fact, that the load exceeds the capacity of the dial. Thereupon the operator will depress the handle 72 of the detent 71, thus permitting the poise-weight holder to descend until he observes that the pointer 11 begins to turn in a reverse direction on the dial. Thereupon the descent of the weight cage is arrested by permitting the detent 71 to re-engage the ratchet wheel. By this operation there will have been deposited upon the poise-weight receiver 9, from the poise weight holder, total capacity weights sufficient to counter-balance the load except for a fraction to be indicated upon the graduations of the dial by the position of the pointer 11. In the example stated the load will have been counterbalanced to the extent of three thousand (3000) pounds, and the hand 11 will reversely turn and point to the five hundred (500) graduation mark on the dial indicated at 80 (Fig. 1). Also by the descent of the weight cage the number carrier will have risen so that the number thirty-five hundred (3500) will appear at the window opposite the main graduation 80, and simultaneously at the remaining windows will have appeared numbers which, like the number at the window opposite the graduation 80, have but to be read to at once make known the weight for any main graduation on the dial in excess of three thousand (3000) pounds and up to and including four thousand (4000) pounds. Should the load exceed four thousand (4000) pounds further descent of the weight cage would be permitted as will now be understood. The provision of the movable, or carrier numbers at a multiplicity or plurality of points on the graduated circle of the dial, thus enables the dial to be directly read at any point of its full circumference by merely reading the numbers and whatever be the design of the line of graduations on the dial the movable carrier offers a means for displaying not only weight numbers within the capacity of the dial, but weight numbers in excess of the capacity of the dial in normal and the same reading direction; in the present embodiment in horizontal reading direction on a vertical plane. The provision on the carrier of main graduation numbers within the capacity of the dial (being the initial numbers of each carrier series) avoids the confusion likely to result in reading weights in excess of the dial capacity when the dial itself is permanently provided with numbers at the main graduations within the capacity of the dial. In the latter instance these capacity numbers would appear in conjunction with the excess capacity numbers and care would have to be taken to distinguish between the two indications.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A scale comprising a registering mechanism including a number carrier, means adapted to cause movement of said carrier relative to other parts of said mechanism, said carrier including a plurality of numbered plates independently adjustable longitudinally and laterally with respect to the path of said relative movement.

2. A scale comprising a registering mechanism including a number carrier, means adapted to cause movement of said carrier relative to other parts of said mechanism, said carrier including a plurality of numbered plates independently adjustable longitudinally and laterally with respect to the path of said relative movement, and a frame on which said carrier is mounted for adjustment laterally of the path of said relative movement.

3. A scale comprising a registering mechanism including a number carrier, means adapted to cause movement of said carrier relative to other parts of said mechanism, said carrier being adjustable towards and from other parts of said registering mechanism and including a plurality of numbered plates independently adjustable longitudinally and laterally with respect to the path of said relative movement.

4. A scale comprising a registering mechanism including a number carrier, means adapted to cause movement of said carrier relative to other parts of said mechanism, said carrier being adjustable towards and from other parts of said registering mechanism and including a plurality of numbered plates independently adjustable longitudinally and laterally with respect to the path of said relative movement, and a frame on which said carrier is mounted for adjustment laterally of the path of said relative movement.

5. In an apparatus of the character described in combination, a scale including a dial provided with openings, a skeleton carrier, one or more number plates removably attached to the branches of said carrier, and means whereby certain of the numbers appearing upon the plate or plates may be displayed in operative relation with the openings in said dial.

6. In an apparatus of the character described, in combination, a scale including a dial provided with openings, a frame, one or more guide bars reciprocal on said frame, a carrier attached to said bar or bars and adjustable toward and from the same, a plurality of number plates on said carrier, and means whereby certain of the numbers appearing upon the plates may be displayed in operative relation with the openings in said dial.

7. In an apparatus of the character described in combination, a scale including a dial provided with openings, a frame, one or more guide bars reciprocal on said frame, a carrier attached to said bar or bars and adjustable toward and from the same, a plurality of number plates on said carrier, and means whereby certain of the numbers appearing upon the plates may be displayed in operative relation with the openings in said dial, said guide bars being in rear of said frame and said carrier being in front of said frame.

8. In an apparatus of the character described in combination, a scale including a dial provided with openings, a frame, a carrier reciprocal on said frame and being of skeleton structure, a plurality of number plates, means adapted to attach said number plates to a branch or branches of said skeleton for adjustment longitudinally and laterally of said branch or branches, and means whereby certain of the numbers appearing upon the plates may be displayed in operative relation with the openings in said dial.

9. In an apparatus of the character described in combination, a scale including a dial provided with openings, a frame, a carrier reciprocal on said frame and being of skeleton structure, a plurality of number plates, means adapted to attach said number plates to a branch or branches of said skeleton for adjustment longitudinally and laterally of said branch or branches, and means whereby certain of the numbers appearing upon the plates may be displayed in operative relation with the openings in said dial, said attaching means including a removable clamp plate adapted to lie opposite one of said branches having legs extending across opposite sides of said branch and the number plate to be clamped thereby, said legs having clamping jaws overlapping the face of said number plate.

10. In an apparatus of the character described in combination, a scale including a dial provided with openings, a frame, a carrier reciprocal on said frame and being of skeleton structure, a plurality of number plates, means adapted to attach said number plates to a branch or branches of said skeleton for adjustment longitudinally and laterally of said branch or branches, means whereby certain of the numbers appearing upon the plates may be displayed in operative relation with the openings in said dial, said attaching means including a removable clamp plate adapted to lie opposite one of said branches having legs extending across opposite sides of said branch and the number plate to be clamped thereby, said legs having clamping jaws overlapping the face of said number plate, and one or more screws threaded in said clamp plate and adapted to be screwed into contact with said branch to effect the attachment.

11. In an apparatus of the character described, in combination, a scale including a dial provided with openings, a frame, one or more guide bars reciprocal on said frame, a carrier attached to said bar or bars and adjustable toward and from the same, said carrier being of skeleton structure, a plurality of number plates, means adapted to attach said plates to the branches of said carrier for adjustment laterally and longitudinally thereof, and means whereby certain of the numbers appearing upon the plates may be displayed in operative relation with the openings in said dial.

12. In an apparatus of the character described, in combination, a scale including a dial having a plurality of series of graduations, each series comprehending less than the capacity of the dial, said dial having windows adjacent said series respectively, a reciprocal carrier having a plurality of series of similarly orderly arranged numbers, said carrier series adapted to register, respectively, with said windows, and means adapted to apply poise-weights to the scale and simultaneously operate said carrier including a gravitative poise-weight holder, a rotatable shaft from which said holder is suspended, a pinion rotatable with said shaft, a rack operated by said pinion and operatively connected to said carrier, and a detent co-operative with said pinion.

13. In an apparatus of the character described, in combination, a scale including a dial having a plurality of series of graduations, each series comprehending less than the capacity of the dial, said dial having windows adjacent said series, respectively, a reciprocal carrier having a plurality of series of similarly orderly arranged numbers, said carrier series adapted to register, respectively, with said windows, means adapted to apply poise-weights to the scale and simultaneously operate said carrier including a gravitative poise-weight holder, a rotatable shaft from which said holder is suspended, a pinion rotatable with said shaft, a rack operated by said pinion and operatively connected to said carrier, a detent co-operative with said pinion, and a yoke in which said rack is guided having arms supported by said shaft adapted to bear against opposite sides of said pinion.

14. In an apparatus of the character described, in combination, a scale including a dial having a plurality of series of graduations, each series comprehending less than the capacity of the dial, said dial having windows adjacent said series, respectively, a reciprocal carrier having a plurality of series of similarly orderly arranged numbers, said carrier series adapted to register, respectively, with said windows, means adapted to apply poise-weights to the scale and simultaneously operate said carrier including a gravitative poise-weight holder, a rotatable shaft from which said holder is suspended, a pinion rotatable with said shaft, a rack operated by said pinion and operatively connected to said carrier, a detent co-operative with said pinion, and a yoke in which said rack is guided having arms supported by said shaft adapted to bear against opposite sides of said pinion, said yoke having bendable arms adapted to keep said rack in co-operative relation to said pinion.

15. In an apparatus of the character described, in combination, a scale including a dial having a window, a number carrier including a number plate reciprocal across said window adapted to exhibit its numbers through said window, and distance pieces intervening said dial and plate at the sides of said window outside the path of the numbers on said plate.

16. In an apparatus of the character described, in combination, a scale including a dial having a window, a number carrier including a number plate reciprocal across said window adapted to exhibit its numbers through said window, and a screen member extending beyond the rear face of the dial and inclining from said dial toward the central line of a number exhibited at said window.

17. In an apparatus of the character described, in combination, a scale including a dial having a window, a number carrier including a number plate reciprocal across said window adapted to exhibit its numbers through said window, and a tube extending from said dial toward said plate opposite said window.

18. In an apparatus of the character described, in combination, a scale including a dial having a window, a number carrier including a number plate reciprocal across said window adapted to exhibit its numbers through said window, and a tube extending from said dial toward said plate opposite said window, said tube tapering toward said plate.

19. In an apparatus of the character described, in combination, a scale including a dial having a window, a number carrier including a number plate reciprocal across said window adapted to exhibit its numbers through said window, and a tube extending from said dial toward said plate opposite said window, said tube tapering toward said plate and terminating short of said plate opposite the path of the numbers on the plate.

20. In an apparatus of the character described, in combination, a scale including a dial having a window, a number carrier including a number plate reciprocal across said window adapted to exhibit its numbers through said window, and a tube extending from said dial toward said plate opposite said window, and carrier bearings extending from the end of said tube at those sides outside the lateral margin of said numbers.

21. In an apparatus of the character described, in combination, a scale including a dial having a window, a number carrier including a number plate reciprocal across said window adapted to exhibit its numbers through said window, a tube extending from said dial toward said plate opposite said window, said tube tapering toward said plate and terminating short of said plate opposite the path of the numbers on the plate, and carrier bearings extending from the end of said tube at those sides outside the lateral margin of said numbers.

22. In an apparatus of the character described, in combination, a scale including a weighing beam with dependent poise-weight receiver pivoted thereto, a dial, a dial pointer operably connected to said beam, a pendulum connected to the beam and adapted to counterbalance a load up to the capacity of the dial, said dial having a plurality of series of graduations, each series comprehending less than the capacity of said dial, said dial having windows adjacent said series, respectively, a carrier including a plurality of number plates adapted to reciprocate across said windows, respectively, said plates being independently adjustable on said carrier longitudinally and laterally of their reciprocal path, said number plates having series of similarly orderly arranged numbers adapted to register with said windows, respectively, successive numbers in any one series differing by the capacity of said dial, a rotatable shaft, a poise-weight holder suspended from said shaft so as to rotate the shaft as it descends, said poise-weight holder constructed to transfer one or more poise-weights to said receiver as it descends, manually operable means adapted to control the descent of said poise-weight holder, manually operable means adapted to rotate said shaft to raise said holder to recover poise-weights, a rack depending from said carrier, a pinion rotated by said shaft in mesh with said rack so as to lift said carrier on descent of said poise-weight holder, and a yoke in which said rack is guided having arms supported by said shaft.

23. In an apparatus of the character described, in combination, a carrier-frame composed of bars having flat front faces, some of said bars having free ends, independent number plates with flat faces to lie against the flat faces of said bars, and means adapted to retain said plates on said bars including independent holding plates facing the rear faces of said bars having legs extending across opposite edges of the bars and number plates, said legs having feet overlapping the faces of said plates, and screws co-operative to draw said feet against said number plates and said number plates against said bars.

24. In an apparatus of the character described, in combination, a carrier-frame composed of bars having flat front faces, some of said bars having free ends, independent number plates with flat faces to lie against the flat faces of said bars, and means adapted to retain said plates on said bars including independent holding plates facing the rear faces of said bars having legs extending across opposite edges of the bars and number plates, said legs having feet overlapping the faces of said plates, and screws co-operative to draw said feet against said number plates and said number plates against said bars, said holding plates being adapted to be removed and applied over said free ends.

25. In an apparatus of the character described, in combination, a carrier-frame composed of bars having flat front faces, some of said bars having free ends, independent number plates with flat faces to lie against the flat faces of said bars, one or more guide bars in planes substantially parallel to said frame, studs on said frame passing through said guide bars, and means adapted adjustably to lock said guide bar or bars to said studs.

26. In an apparatus of the character described, in combination, a carrier-frame composed of bars having flat front faces, some of said bars having free ends, independent number plates with flat faces to lie against the flat faces of said bars, one or more guide bars in planes substantially parallel to said frame, studs on said frame passing through said guide bars, means adapted adjustably to lock said guide bar or bars to said studs, a number frame operating means, means adapted to operatively connect said carrier frame to said operating means including a rack bar having a fork, a bar on the carrier frame lying in said fork, and means adapted to clamp said last mentioned bar between the tines of said fork.

27. In an apparatus of the character described, in combination, a sheet metal dial having one or more windows the walls of which windows taper from the front face of the dial toward the rear face and project on the rear face, and a member carrying characters adapted to be selectively displayed by registration with such rearwardly projecting walls.

28. In an apparatus of the character described, in combination, a sheet metal dial having one or more windows the walls of which windows taper from the front face of the dial toward the rear face and project on the rear face, the edge of said projection or projections having nibs at opposite sides extending slightly beyond said edge.

29. In an apparatus of the character described, in combination, a scale including a dial having a line of graduations comprehending a full circumference lacking a small arc, a dial pointer turning on an axis within said circumference adapted to travel along the full extent of said graduated line in either direction, said dial having windows adjacent the beginning and the end of said graduated line and at a plurality of other points adjacent said line, a weigh beam operatively connected to said pointer, a load receiver connected to said beam, a carrier frame reciprocal relative to said dial, a plurality of number plates each including a series of load numbers adapted to be moved one by one into and out of registry with said windows, respectively, said plates being adjustable on said carrier frame to position them in alignment with said windows, a poise-weight receiver operatively connected to said beam, a reciprocal poise-weight holder gravitatively movable to transfer one or more poise-weights to said receiver, means adapted to arrest the gravitative movement of said holder at various points in its path of travel, and means whereby the gravitative movement of said holder imparts movement to said carrier frame to cause the numbers on said plates to successively register with said windows, respectively.

30. In an apparatus of the character described, in combination, a scale including a dial having a line of graduations comprehending a full circumference lacking a small arc, a dial pointer turning on an axis within said circumference adapted to travel along the full extent of said graduated line in either direction, said dial having windows adjacent the beginning and the end of said graduated line and at a plurality of other points adjacent said line, a weigh beam operatively connected to said pointer, a load receiver connected to said beam, a carrier reciprocal relative to said dial having a plurality of series of load numbers adapted to be moved one by one into and out of registry with said windows, respectively, and a poise-weight holder gravitative to transfer and recover weights from said load receiver, the weight of said holder being arranged to oppose the weight of said carrier.

31. In an apparatus of the character described, in combination, a scale including a dial having a line of graduations comprehending a full circumference lacking a small arc, a dial pointer turning on an axis within said circumference adapted to travel along the full extent of said graduated line in either direction, said dial having windows adjacent the beginning and the end of said graduated line and at a plurality of other points adjacent said line, a weigh beam operatively connected to said pointer, a load receiver connected to said beam, a carrier reciprocal relative to said dial having a plurality of series of load numbers adapted to be moved one by one into and out of registry with said windows, respectively, and a poise-weight holder gravitative to transfer and recover weights from said load receiver, a rotatable shaft, and operative connections between said carrier and said shaft and between said poise-weight holder and said shaft whereby rotation of said shaft moves said poise-weight holder and said carrier in opposite directions.

32. In an apparatus of the character described, in combination, a scale including a dial having a circular line of graduations, a dial pointer turning on an axis within said circular line adapted to travel along the full extent of said line in either direction, said dial having windows at the beginning and the end of said line and at a plurality of points adjacent said line in each of the two halves of the dial, a reciprocal carrier having a plurality of series of load numbers reading in normal and the same reading direction, and means adapted to cause relative movement between said dial and carrier to bring the numbers of said series successively into registry with said windows, respectively.

In testimony whereof I affix my signature, in the presence of two witnesses.

ALAN E. ASHCRAFT.

Witnesses:
PERLEY F. HAZEN,
JOHN C. CLARK.